United States Patent [19]
Brown et al.

[11] Patent Number: 5,890,361
[45] Date of Patent: Apr. 6, 1999

[54] EXHAUST GAS FLUIDICS APPARATUS

[75] Inventors: Jacqueline L. Brown, Lindley; Thomas D. Ketcham, Big Flats; Mallanagouda D. Patil, Corning, all of N.Y.

[73] Assignee: Corning Incorporated, Corning, N.Y.

[21] Appl. No.: 790,212

[22] Filed: Jan. 29, 1997

[51] Int. Cl.$^6$ .................................................. F01N 3/00
[52] U.S. Cl. .............................. 60/288; 60/289; 60/297; 60/311; 60/307
[58] Field of Search .................. 60/288, 311, 297, 60/289, 298, 307, 299

[56] References Cited

U.S. PATENT DOCUMENTS

| | | |
|---|---|---|
| 3,144,309 | 8/1964 | Sparrow . |
| 3,710,575 | 1/1973 | Lamm ........................................ 60/298 |
| 3,775,064 | 11/1973 | Berger et al. ............................. 60/307 |
| 3,783,619 | 1/1974 | Alquist . |
| 3,813,226 | 5/1974 | Heitland et al. . |
| 3,844,119 | 10/1974 | Herrbrich . |
| 3,988,890 | 11/1976 | Abthoff et al. . |
| 3,995,423 | 12/1976 | Aoki et al. . |
| 4,023,360 | 5/1977 | Wössner et al. . |
| 4,094,645 | 6/1978 | Bailey ........................................ 60/299 |
| 4,107,922 | 8/1978 | Wossner ................................... 60/298 |
| 5,067,319 | 11/1991 | Moser . |
| 5,277,026 | 1/1994 | Boll et al. . |
| 5,336,824 | 8/1994 | Shamshoum et al. .................. 585/475 |
| 5,345,762 | 9/1994 | Lütze . |
| 5,347,309 | 9/1994 | Moeckel et al. . |
| 5,398,503 | 3/1995 | Danno et al. . |
| 5,449,499 | 9/1995 | Bauer et al. . |
| 5,685,143 | 11/1997 | Aitta et al. .............................. 60/297 |
| 5,758,497 | 6/1998 | Frederiksen et al. ..................... 60/299 |

FOREIGN PATENT DOCUMENTS

| | | |
|---|---|---|
| 0 661 098 A2 | 7/1995 | European Pat. Off. . |
| 38 03 917 A1 | 8/1989 | Germany . |
| 39 13 343 A1 | 11/1991 | Germany . |
| 1 275 772 | 5/1972 | United Kingdom . |
| 2 240 486 | 8/1991 | United Kingdom . |
| 95/18292 | 7/1995 | WIPO . |

OTHER PUBLICATIONS

U.S. Ser. No. 08/484,617; Filed Jun. 8, 1995; In–Line Adsorber System.
U.S. Ser. No. 08/375,699; Filed Jan. 19, 1995; By–Pass Adsorber System.

*Primary Examiner*—Thomas E. Denion
*Attorney, Agent, or Firm*—Timothy M. Schaeberle

[57] ABSTRACT

The invention is directed at an exhaust system exhibiting an increased flow uniformity under diversion conditions comprising: (1) a honeycomb structure having an inlet and outlet end disposed in a housing located in an exhaust gas stream and downstream from an engine, and having a first substantially unobstructed flow region, and a second more obstructed flow region adjacent the first region, both providing a flow path for the exhaust gases in the exhaust gas stream; and, (2) a fluidics apparatus disposed in the exhaust stream comprising a diverter body located proximate to the first region, a diversion fluid source, a conduit for directing the diversion fluid toward the diverter body and an exhaust flow divergent device.

14 Claims, 8 Drawing Sheets

Measurement Probe Horizontal Position

CFPM

| | | |
|---|---|---|
| ▭ -400 - -250 | ▭ 50 - 200 | ▦ 500 - 650 | ▨ 950 - 1100 |
| ▭ -250 - -100 | ▭ 200 - 350 | ▭ 650 - 800 | ▥ 1100 - 1250 |
| ▭ -100 - 50 | ▨ 350 - 500 | ▦ 800 - 950 | |

Measurement Probe Horizontal Position

CFPM

| | | | |
|---|---|---|---|
| ▨ 800 - 1000 | ▦ 200 - 400 | ☐ -400 - -200 | ⋯ -1000 - -800 |
| ▤ 600 - 800 | ░ 0 - 200 | ▩ -600 - -400 | |
| ▥ 400 - 600 | ▬ -200 - 0 | ▨ -800 - -600 | |

EXHAUST GAS FLUIDICS APPARATUS

FIELD OF INVENTION

This invention relates to an improved engine exhaust system, and more particularly to an exhaust system comprised of a honeycomb structure having a first substantially unobstructed flow region and a second more obstructed flow region adjacent to the first region, and a fluidics apparatus having an exhaust gas divergent device.

BACKGROUND OF THE INVENTION

While catalytic converters are well known for reducing oxides of nitrogen (NOx), and oxidizing hydrocarbons and carbon monoxide from automobile exhaust, these reactions typically take place after the catalyst has attained its light-off temperature, at which point the catalyst begins to convert the hydrocarbons to harmless gases. The typical catalytic light-off time for most internal combustion engine systems is around 50 to 120 seconds (generally in the temperature range of 200°–350° C.), with the actual catalytic light-off time for any system depending on a number of factors; including, the position of the catalyst relative to the engine, the aging of the catalyst, washcoat technology, as well as the noble metal loading. Seventy to almost ninety five percent of hydrocarbon emissions from automotive vehicles are emitted during this first minute, or so, of "cold start" engine operation. Without additional measures large amounts of hydrocarbons are likely to be discharged into the atmosphere during this period. Environmentally, increasing the effectiveness of automotive emission control systems during cold start, so that the amount of hydrocarbons discharged into the atmosphere during cold-start are kept at extremely low levels, has become increasingly important.

Various methods have been proposed for meeting the stringent hydrocarbon emission standards during cold start including, the use of electrically heated catalysts (EHCs), the use of molecular sieve structures (hydrocarbon adsorbers) to adsorb and hold significant amounts of hydrocarbons until the converter has attained its light-off temperature, as well as combinations of both. Recently, an improved in-line exhaust system was in U.S. application Ser. No. 08/484,617 (Hertl et al.); assigned to the instant assignee, and herein incorporated by reference. Specifically, Hertl et al. discloses an in-line exhaust system having a main catalyst, a housing downstream of the main catalyst having an inlet and an outlet end, and having disposed therein a molecular sieve structure for adsorbing hydrocarbons. The molecular sieve structure exhibits: (1) a first region forming an unobstructed or substantially unobstructed flow path for exhaust gases of an exhaust stream; and, (2) a second, more restricted flow path or region adjacent the first region. Furthermore, the exhaust system includes a burn-off catalyst disposed downstream from the adsorber having a light-off temperature. The system also includes a diverting means disposed in the housing for passing secondary air into the housing; the flow pattern of the secondary air directs a portion of the exhaust gases of the exhaust stream through the second region of the adsorber prior to the main catalyst attaining its light-off temperature.

Although, the system of Hertl performs better than earlier exhaust systems, environmental concerns and legislation drafted to meet those concerns continues to lower legally acceptable hydrocarbon emission standards, e.g., the California ultra-low emission vehicle (ULEV) standards. Notwithstanding the foregoing developments, work continues to discover improvements to existing systems and to provide new systems capable of meeting the stricter exhaust emission standards.

One such improvement is disclosed in copending, coassigned application, U.S. Ser. No. 08/578,003 (Brown et al.) wherein it discloses an exhaust system comprised of the following: (1) a honeycomb structure having an inlet and outlet end disposed in a housing and possessing a first substantially unobstructed flow region, a second more obstructed flow region adjacent the first region; and, (2) a fluidics apparatus disposed in the exhaust stream proximate to the first region for creating a negative flow zone within the first region. The fluidics apparatus of Brown includes a source of a diversion fluid, typically air, and a diverter body for diverting the diversion fluid, both of which combine to result in a negative flow zone which aids in diverting the exhaust gas away from the first flow region toward the second flow region.

Although this system provides improved performance for substrates possessing two flow paths/regions, the resulting flow characteristics for this system when the fluidics apparatus is functioning, e.g., under adsorbing conditions, are not ideal. For example, the system of Brown, although an improvement over exhaust systems to date, produces an exhaust or air flow pattern, under diverted conditions which, generally exhibits a high flow volume in the cells proximate to the center hole and a significantly decreased flow volume in those the peripheral cells nearer the edge of the substrate. As a result, work continues to discover improved fluidics systems for use with exhaust systems and accordingly, it is one of the objectives of the instant invention to provide an engine exhaust system exhibiting a more uniform diverted exhaust flow.

SUMMARY OF THE INVENTION

Accordingly, described herein is an exhaust system exhibiting an increased flow uniformity under diversion conditions comprising: (1) a honeycomb structure having an inlet and outlet end disposed in a housing located in an exhaust gas stream and downstream from an engine, and having a first substantially unobstructed flow region, and a second more obstructed flow region adjacent the first region, both providing a flow path for the exhaust gases in the exhaust gas stream; and, (2) a fluidics apparatus disposed in the exhaust stream comprising a diverter body located proximate to the first region, a diversion fluid source, a conduit for directing the diversion fluid toward the diverter body and an exhaust flow divergent device.

One advantage of this exhaust system, is that this fluidics diverted exhaust system can be incorporated into an overall in-line exhaust system wherein the honeycomb structure is an adsorber and the inventive exhaust system is located in an exhaust stream between a lightoff catalyst and a burnoff catalyst. The increase in uniformity of the exhaust flow in the peripheral portion of honeycomb structure created by the utilization of the exhaust gas divergent device in the fluidics apparatus allows for a more complete use of the adsorptive surfaces of the adsorber, thereby enhancing adsorption and ultimately reducing hydrocarbon emissions. Additionally, more uniform distribution, and a more compete utilization of adsorptive surfaces, i.e., a better utilization of the zeolites and the honeycomb, allows for the use of more compact exhaust systems.

DETAILED DESCRIPTION OF THE INVENTION

The flow patterns of exhaust gases which result when a diverter system is operational are described in the copending Brown and Hertl applications. As generally described therein, the exhaust gases are directed towards the honeycomb structure whereupon a fluidics apparatus located proximate to the inlet of the low flow resistance region, diverts the exhaust gases. The operation of the fluidics apparatus specifically involves directing a diversion fluid toward and into contact with a diverter body, thereby causing the diversion fluid to exhibit a flow component transverse to the flow direction in the central or first flow region; i.e., radially diverting the diversion fluid. Specifically, this diversion fluid is diverted into the path of the exhaust gas to direct at least a portion of the exhaust gas into the second flow or peripheral flow region.

Figure 1:
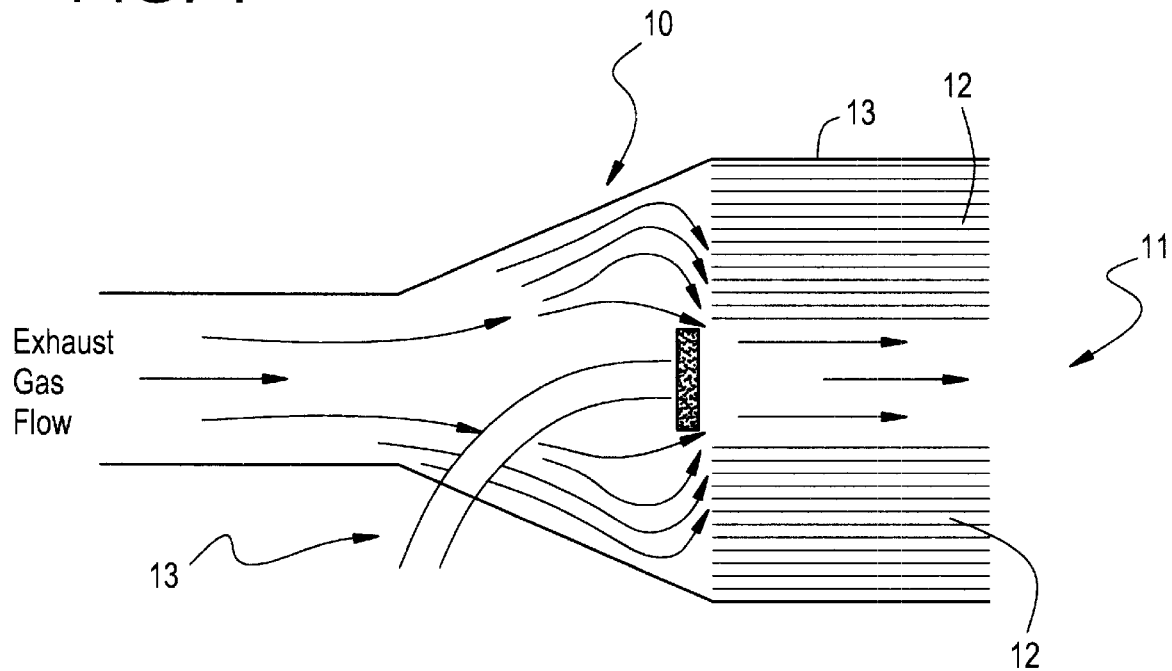
FIG. 1 is a schematic generally illustrating the typical direction of undiverted exhaust gas flow through a honeycomb structure.
Figure 2:
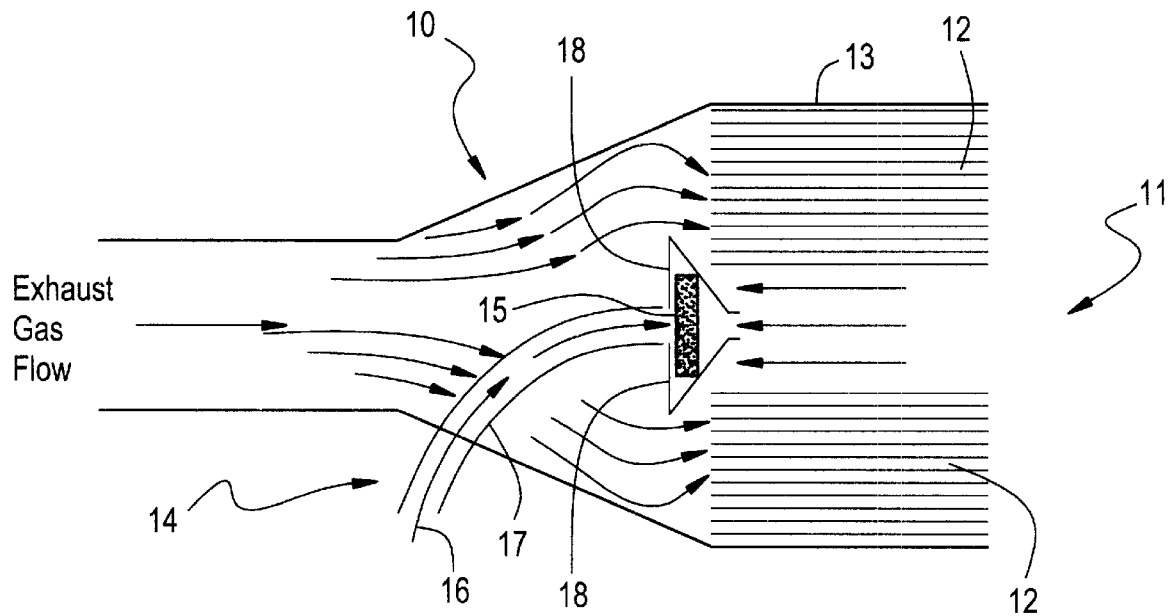
FIG. 2 is a schematic generally illustrating the typical direction of exhaust gas flow through a honeycomb structure created during "diverter-on" operation.

Referring to FIGS. 1 and 2 depicted therein are the typical flow patterns of exhaust gas under undiverted conditions ("diverter-off") and the typical flow patterns of exhaust gases and diversion fluid under diverted conditions ("diverter-on"); the flow arrows indicating the exhaust flow patterns. FIG. 1 schematically illustrates the undiverted flow pattern typical of exhaust gas; e.g., during normal, hot engine operation, for a system containing an adsorber and a non-operating fluidics apparatus. In general, the undiverted exhaust gas which enters the housing 10 flows mostly through the central hole 11, bypassing the peripheral surfaces 12 of the honeycomb substrate 13. In other words, as a result of standard fluid dynamics, the exhaust gases tend to exhibit a higher volume flow through the low flow resistance region 11, centrally positioned in this embodiment, than through the peripheral regions 12.

FIG. 2 illustrates the resulting flow pattern of the exhaust gas when the diverter system is operational, e.g., during cold start (diverter-on conditions), in systems where a fluidics apparatus in the exhaust stream diverts the gas flow radially outward to flow through an adsorber honeycomb. In general, the exhaust gases flowing from an engine enter the housing 10 and continue towards the honeycomb structure 13 whereupon the fluidics apparatus 14, located proximate to the inlet of a low flow resistance or central hole region 11, functions to divert the exhaust gases. The operation of the fluidics apparatus 14 specifically involves introducing into the housing 10 and directing towards and into contact with a diverter body 15, a diversion fluid 16 via a diversion fluid conduit 17, thereby radially diverting the fluid into the path of the exhaust gas; i.e., imparting a flow component to the diversion fluid which is transverse to the direction of exhaust gas flow entering the housing. This diversion, or change in flow pattern, of the diversion air essentially results in the formation of a fluid shield (arrow pair 18) in front of the central flow region 11 which redirects a portion of the exhaust gases away from the first or central flow region 11 and toward the second or peripheral flow region 12.

It is appreciated that these exhaust flow patterns, diverted and undiverted, are typical for any system which possesses a fluidics diverter and a substrate possessing two separate flow regions and not just "in-line" systems where the substrate is an adsorber.

Figure 3:
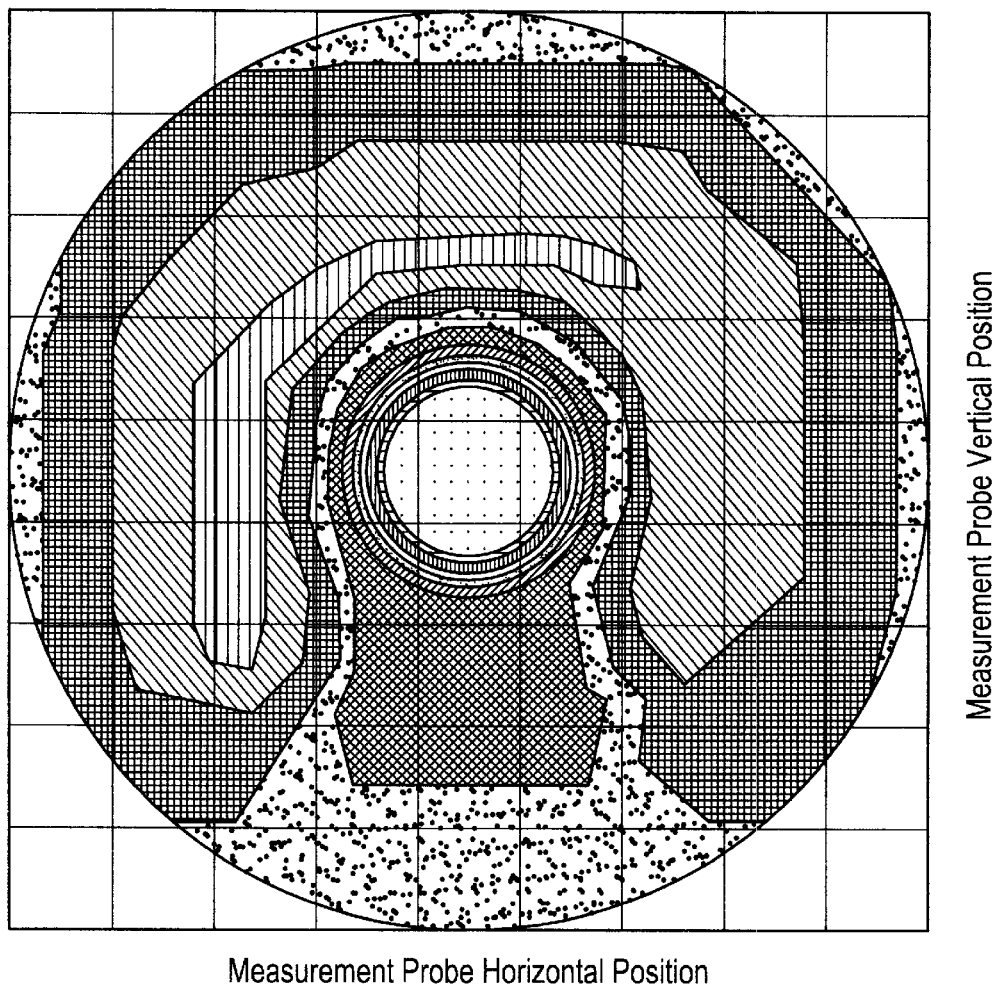
FIGS. 3 is a graphical illustration of the typical non-uniform, diverter-on flow profile exhibited by an exhaust system comprised of a round honeycomb substrate and a fluidics apparatus having a round diverter body but no exhaust flow divergent device.

Illustrated in FIG. 3 is a typical non-uniform diverter-on flow profile exhibited by a round substrate (the round substrate and low-flow resistance region image are seen superimposed on the flow profile) possessing a fluidics apparatus comprising a round diverter body, i.e., a non-uniform exhaust flow profile which is typical of systems and flows like those schematically illustrated above in FIG. 2. Specifically, FIG. 3 illustrates an high average flow volume through the cells nearest the central or low resistance flow region and a decreasing flow volume as the cells approach the periphery; a non-uniform "diverter-on" flow pattern.

Figure 4:
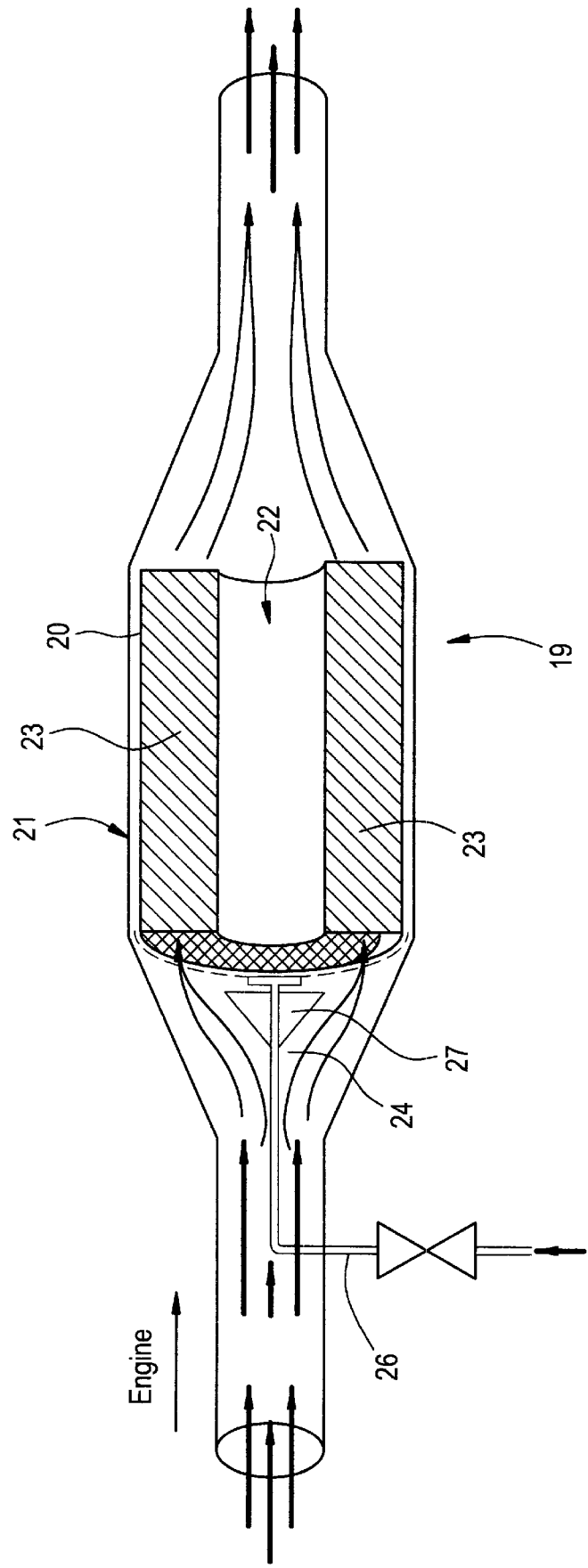
FIG. 4 is a sectional (longitudinal) view of the invention showing an exhaust system in which exhaust gas flows from the engine and is diverted through the honeycomb structure.

The instant invention is directed at an engine exhaust system which seeks to overcome the aforementioned and undesirable non-uniform "diverter-on" flow characteristic typical of previous exhaust systems comprising substrates and utilizing a fluidics diverter. In other words, this inventive exhaust system provides increased flow performance, i.e., a fluidics apparatus which provides an increased uniformity "diverter-on" flow. Specifically, FIG. 4 depicts an engine exhaust system 19 comprising a honeycomb structure 20 having an inlet and outlet end disposed in a housing 21 and located in an exhaust gas stream downstream from an engine (not shown). The honeycomb structure 20 possesses a first substantially unobstructed flow region 22, and a second more obstructed flow region 23 adjacent the first region, the first region being disposed to provide a substantially unobstructed flow path for the exhaust gases in the exhaust gas stream.

In other words, the honeycomb structure is a substantially cellular structure having an open region running longitudinally parallel between the inlet and outlet ends of the structure and a peripheral region adjacent the open region, the peripheral region having a plurality of cells running longitudinally parallel between the inlet and the outlet ends of the structure. Preferably, the honeycomb structure is centrally disposed in the housing and exhibits a central, open-core first region and a peripheral, cellular second region; preferably, the central region occupying an area in the range of 0.5 to 50% of the frontal area of the honeycomb structure. It is contemplated that the honeycomb structure utilized in this exhaust system could also be comprised of a variable cell honeycomb structure wherein the first region has a first group of cells and a second region has a second group of cells whose cell sizes are smaller than the first group of cells.

The system further includes a fluidics apparatus 24, disposed in the exhaust stream comprised of the following elements: (1) a diverter body 25; (2) a diversion fluid source (not shown); (3) a conduit 26 for directing the diversion fluid toward the diverter body 25; and (4) an exhaust flow divergent device 27. The diverter body 25 is located proximate to inlet of the first or low flow resistance region 22.

Figure 5:
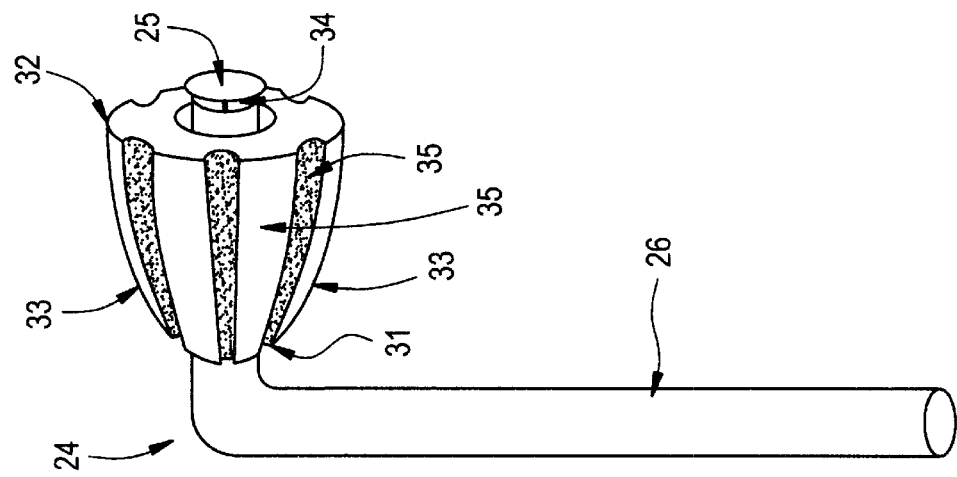
FIG. 5 is an enlarged perspective view of the fluidics apparatus of FIG. 4 exhibiting a cone-shaped exhaust gas divergent device.
Figure 6:
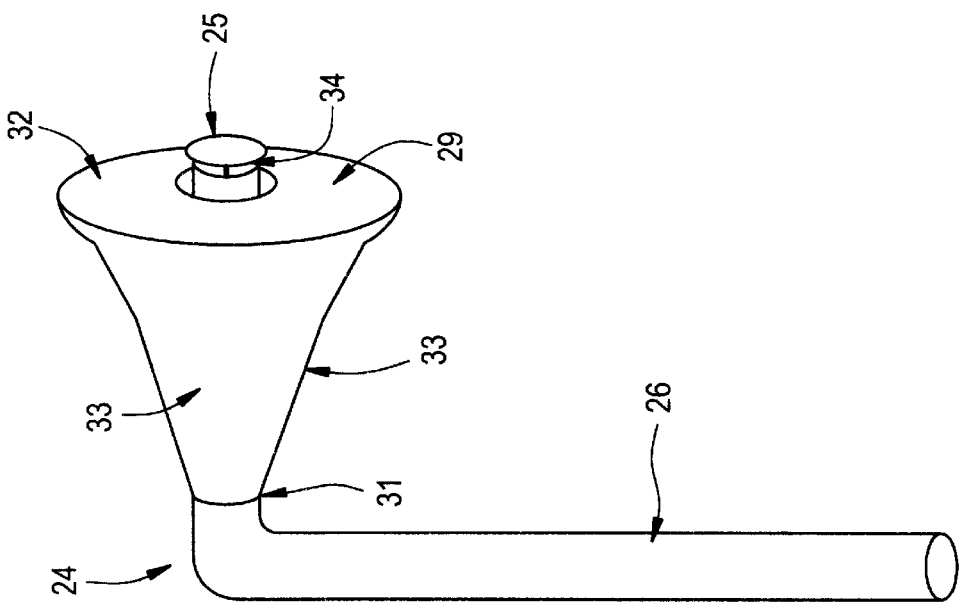
FIG. 6 is an enlarged perspective view of the fluidics apparatus as FIG. 4 exhibiting a trumpet-shaped exhaust gas divergent device.
Figure 7:
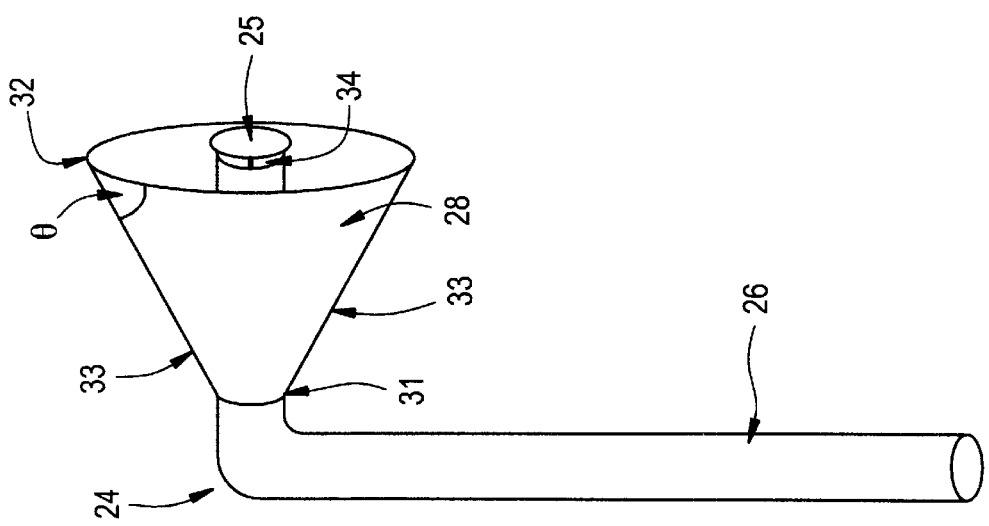
FIG. 7 is an enlarged perspective view of the fluidics apparatus as FIG. 4 exhibiting a bell-shaped exhaust gas divergent device.

Referring now FIGS. 5–7 depicted therein, in greater detail, are three embodiments of the aforementioned fluidics apparatus, each possessing a different exhaust flow divergent device. Each of these exhaust flow divergent devices, 28, 29 and 30, serve to direct the incoming flow of exhaust gases toward the peripheral or higher flow resistance region, thereby increasing the uniformity of the exhaust gas which enters the peripheral region of the honeycomb substrate. The divergent devices 28, 29 and 30, as illustrated, possesses a small diameter upstream portion 31, a large diameter downstream portion 32, and a side surface 33 connecting the two portions. Preferably, the diameter of the larger portion should be smaller than the diameter exhibited by the low-flow resistance region; this allows for a more efficient and workable flow volume (>~60%) through the low flow resistance or hole region under diverter-off conditions. Preferably, the side surfaces exhibit a divergent angle (θ), defined as the angle formed between the side surface and a reference plane perpendicular to the direction of the exhaust flow, of between about 45 and 75°; more preferably between about 60 to 750.

Referring specifically now to FIG. 5, the fluidics apparatus 24 depicted therein is comprised of a round flat plate diverter body 25, a conduit 26 for directing a diversion fluid (not shown) toward the diverter body 25, with the conduit and diverter combining to form a slot 34 through which the diversion fluid is directed. Additionally, the fluidics apparatus 24 includes a cone-shaped exhaust flow divergent device 28.

Referring specifically now to FIG. 6 the fluidics apparatus embodiment depicted therein, is again comprised of a round flat plate diverter body 25 and a conduit 26 for directing a diversion fluid (not shown) toward the diverter body 25; the conduit and diverter combining to form slot 28 through which the diversion fluid may be directed. The exhaust flow divergent device in this embodiment is comprised of trumpet-like shaped exhaust flow divergent device 29.

Referring now to FIG. 7, the fluidics apparatus embodiment depicted therein, is again comprised of a round flat plate diverter body 25, a conduit 26 for directing a diversion fluid (not shown) toward the diverter body 25; the conduit and diverter configured to form slot 28. The exhaust flow divergent device in this further embodiment is comprised of bell-shaped exhaust flow divergent device 30. It should be noted that the sides of the bell-shaped divergent device depicted herein are modified to include channels 35 which result in an increased flow volume through the low-flow resistance region under diverter-off conditions; a feature which may be added to either the cone or trumpet-shaped devices as well.

Figure 8:
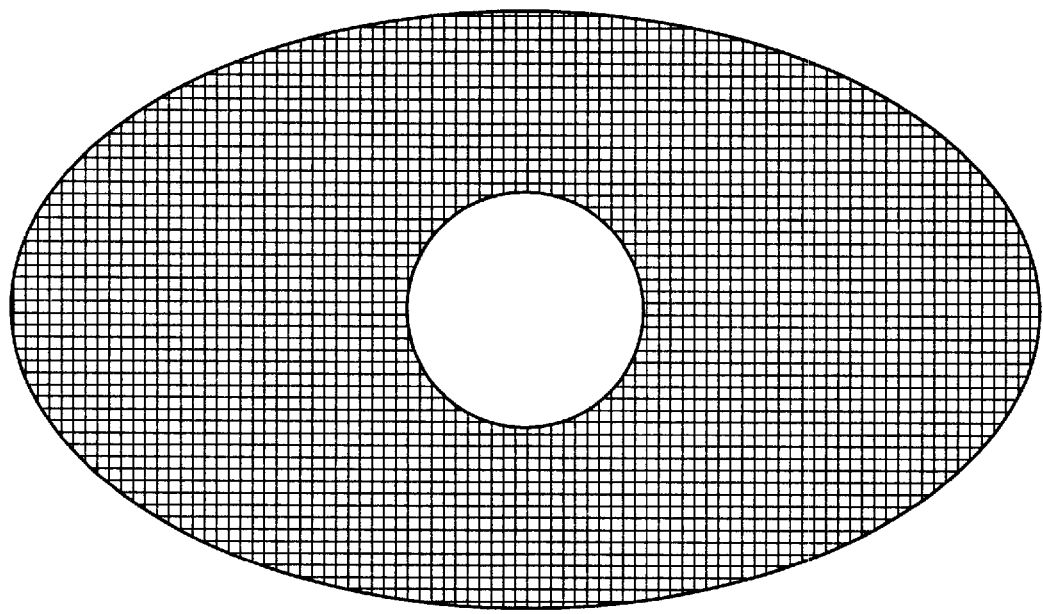
FIG. 8 is a perspective view of an elliptical honeycomb.

The above description describes the utilization of cylindrical substrates having round cross-sections (round inlet and outlet end), and the use of simple round diverter bodies and exhaust gas divergent devices having round cross sections, i.e., divergent devices having round upstream and downstream portions. However, it is noted that elliptical-shaped substrates as depicted in FIG. 8. may also used for under-car applications where space considerations are of a concern. It is therefore contemplated, that if the substrate exhibits an elliptical shape (inlet and outlet ends of an elliptical shape) the exhaust gas divergent device may also comprise upstream and downstream portions exhibiting a non-round or substantially elliptical cross-sectional shape.

In addition to providing for an increased exhaust flow uniformity during "diverter-on" conditions, this exhaust system configuration possesses other desirable attributes as follows: (1) a resultant, more effective use of the honeycomb surface area, e.g., in those applications wherein the substrate is a catalyst, more catalyst surface area is effectively utilized resulting in more efficient catalyzation; (2) a negative flow, or low positive flow of less than about 20% of total exhaust, in the low flow resistance region, during "diverter on" conditions; (3) a "diverter-off" flow through the low-flow resistance region of approximately greater than about 60% of the total exhaust flow volume; (4) a fluidics apparatus configuration, comprised of the diversion body and the divergent device, which produces minimum back pressure in the system.

Figure 9:
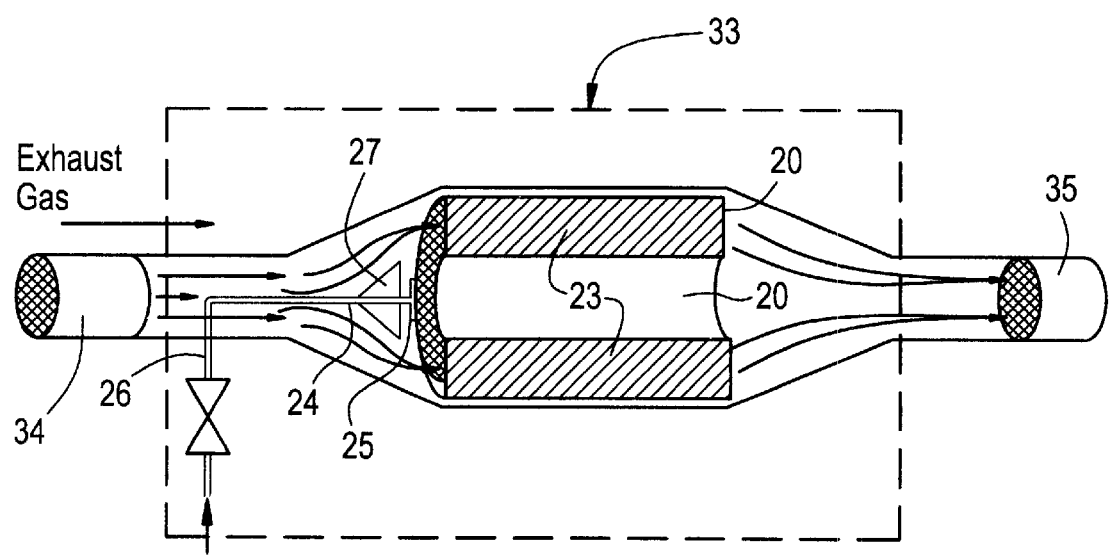
FIG. 9 is a sectional (longitudinal) view of one embodiment of the invention wherein the inventive exhaust system is incorporated into an overall "in-line" exhaust system.

It is contemplated that this fluidics apparatus described above and shown in examples below has utility as part of an overall in-line exhaust system like that disclosed in the aforementioned Hertl et al. reference, i.e., the honeycomb substrate disclosed hereinabove would be comprised of a molecular sieve or hydrocarbon adsorber. Specifically, referring now to FIG. 9, this in-line exhaust system includes the following: (1) a main catalytic converter 36 having a light-off temperature disposed downstream from an engine; (2) a burn-off catalyst 37 disposed downstream from the main catalytic converter 36, such that an exhaust stream is formed connecting the engine, the main catalytic converter and the burn-off catalyst; and (3) the inventive exhaust system 38 described herein including a honeycomb structure 20 comprised of a molecular sieve or adsorber. More specifically, the honeycomb structure 20, comprised of a molecular sieve structure, possesses an inlet and outlet end, is located in the exhaust stream between the main catalytic converter 36 and the burn-off catalyst 37, and exhibits a desorption temperature. Additionally, the molecular sieve/honeycomb structure 20 includes a first substantially unobstructed flow region 22, and a second more obstructed flow region 23 adjacent the first region, the first region being disposed in the exhaust stream to provide a substantially unobstructed flow path for exhaust gases in the exhaust stream from the engine to the burn-off catalyst. The fluidics apparatus of this exhaust system comprises the following: (1) a diversion air conduit 26 and diversion fluid source (not shown); (2) a diverter body 25 positioned proximate to the center of the first flow region 22 for diverting the exhaust gases away from the first region into the second region 23 to adsorb hydrocarbons under conditions when the second region 23 is below the molecular sieve's desorption temperature; and (3) an exhaust gas divergent device 27 disposed upstream of the molecular sieve 20 for directing the flow of the exhaust gas towards the second flow region.

Generally, this "in-line" system is configured such that, during "diverter-on" operation, the diverter body, the diversion air and the exhaust gas divergent device combine to divert most of the exhaust through the honeycomb periphery containing the molecular sieves; either a uniformly distributed flow or a flow profile such that the higher flow occurs through the cells away from the low-flow resistance region. Preferably, the system is configured to provide maximum adsorption of hydrocarbons; i.e., a negative flow or low positive flow of less than 20% of total exhaust should pass through the center hole.

As a result of the utilization of the exhaust gas divergent device in the fluidic apparatus of the "in-line" system and the resultant relatively uniform or high peripheral exhaust flow through the honeycomb molecular sieve body, this "in-line" system achieves a better utilization of the entire adsorptive surface; i.e., better hydrocarbon adsorption. Furthermore, a more uniform or increased peripheral flow in those adsorber applications helps to avoid premature desorption by causing more adsorption to occur away from the low-flow resistance or hole region; since the regions closer to the central region typically heat up faster than those peripheral regions more distant from the center, they tend to desorb faster, sometimes prior than the lightoff of the burn-off catalyst.

A "molecular sieve" as used herein refers to crystalline substances or structures having pore sizes suitable for adsorbing molecules. In general, this term is used to a class of materials that exhibit selective absorption properties; i.e., they separate components of a mixture on the basis of molecular size and shape differences. Such materials include silicates, the metallosilicates, metalloaluminates, the $AlPO_4$s, silico- and metalloaluminophosphates, zeolites and the like. Furthermore, the terms "adsorber" and "adsorption" as used herein are intended to encompass both adsorption and absorption; it is contemplated that both processes may occur in the molecular sieve structure of the invention.

If the honeycomb substrate comprises a molecular sieve structure, it, preferably, comprises zeolites supported on the honeycomb structure, with the zeolites selected from the group consisting of ZSM-5, USY, Mordenite, Beta zeolites and combinations of these. On the other hand, the molecular sieve structure may comprise an extruded zeolite selected from the same zeolite group.

The present invention is hereinafter described in more detail by way of Examples. However, the present invention is not restricted to these examples. In other words, the following non-limiting examples are presented to more fully illustrate the invention.

EXAMPLES

Examples 1–8

Simulated exhaust systems resembling the system as depicted in FIGS. 4 and utilizing either a cone-shaped exhaust gas divergent device similar to that illustrated in FIG. 5 or the trumpet-shaped exhaust gas divergent device similar to that illustrated in FIG. 6 were used to illustrate the increased "diverter-on" flow uniformity characteristic. Specifically, the exhaust system configurations were comprised of the following components: (1) a cylindrical 400 cell per square inch (cpsi) honeycomb structure exhibiting a 11.85 cm diameter and a 3.81 cm diameter central hole region; and, (2) a fluidics apparatus comprised of the following: (a) a straight tube conduit positioned proximate to the honeycomb substrate's hole region, exhibiting a minimum outside diameter of 1.59 cm., for delivering the diversion fluid; and, (b) either a cone or trumpet-shaped exhaust flow divergent device having a variable divergent angle ($\theta_x$), a 1.27 cm. diameter upstream portion, a downstream portion of a variable diameter ($D_1$) positioned a variable distance ($D_2$) upstream, or downstream, of the downstream surface of the of the diverter body—a negative $D_2$ indicates that the exhaust gas divergent device's downstream portion is located downstream of the diverter body, i.e. the diverter is recessed into the downstream portion; and (3) a round flat-plate diverter body, exhibiting a variable diameter ($D_3$), positioned approximately 1 mm downstream of the conduit outlet and a variable distance $D_4$ upstream of the substrate inlet face—a 1 mm slot was formed between the diverter body and the diverter conduit opening for passage of diversion fluid, air, in this example.

Figure 10:
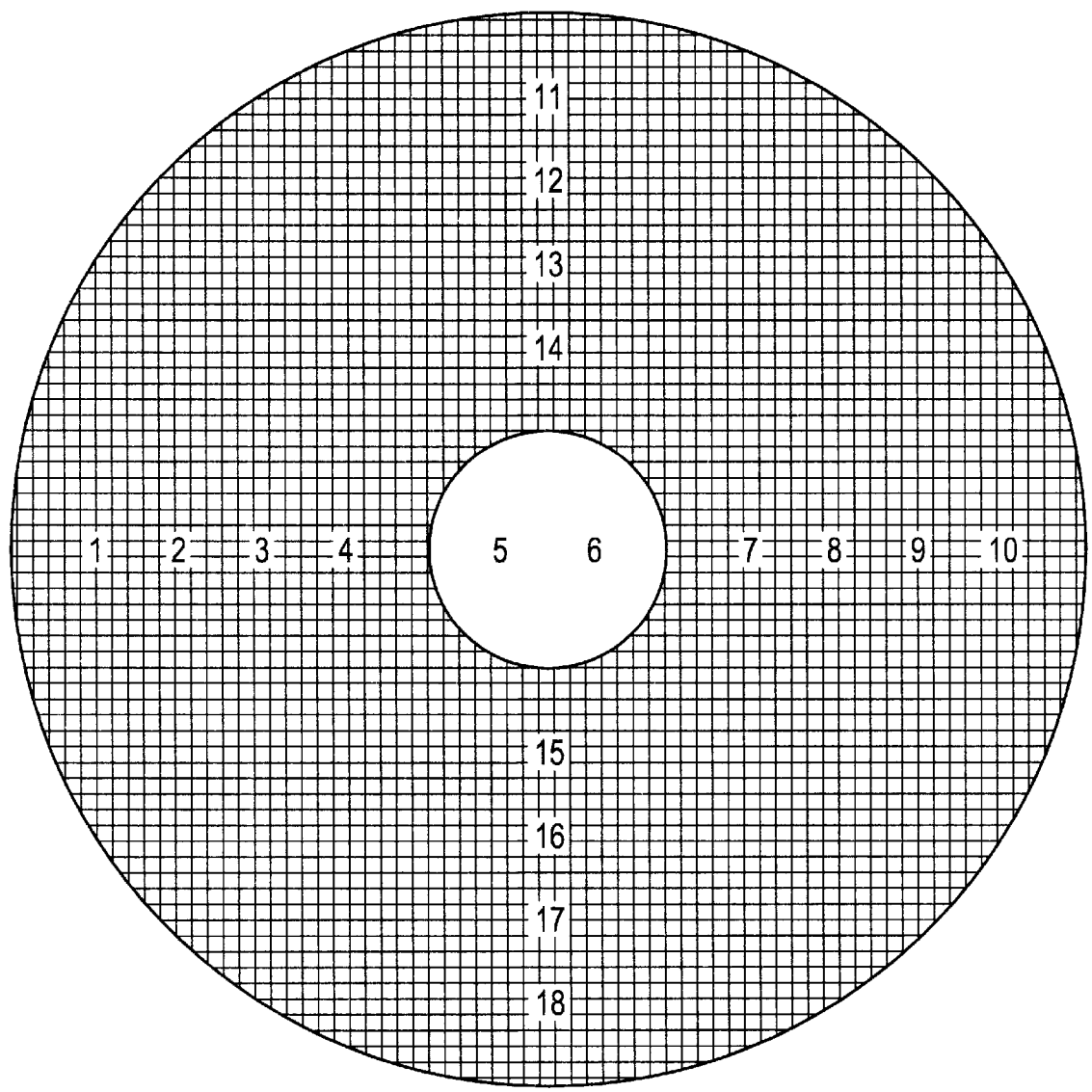
FIG. 10 is an illustration of the linear flow measurement positions at the outlet end of an circular honeycomb substrate.

Room temperature air, simulating exhaust flow, was passed into the housing and directed at the honeycomb substrate at a volumetric flow rate of about 40 cubic feet per minute (cfpm). The linear flow rate, in feet per minute (fpm), of the air leaving the honeycomb substrate was measured at several positions, horizontal positions and vertical positions 1–18 indicated in FIG. 10, on the downstream face of the honeycomb structure utilizing a hand held Omegaflo model 610 Anemometer. These measurements were used to generate a flow profile for each of the Examples and averaged to obtain the average linear flow velocity in the central region (Cent. Flow V.) and in the peripheral region (Periph. Flow V.); these average flow data, along with $D_1$–$D_4$ above, are recorded, in Table I.

TABLE I

| Ex. No | Shape/$\theta_x$ | $D_1$ (mm) | $D_2$ (mm) | $D_3$ (mm) | $D_4$ (mm) | off/on | C. Flow V. (cfpm) | P. Flow V. (cfpm) |
|---|---|---|---|---|---|---|---|---|
| 1 | trumpet/45° | 5.08 | 1 | 15.9 | 4 | off | 1650 | 280 |
|   |   |   |   |   |   | on | 80 | 919 |
| 2 | trumpet/45° | 5.08 | 15 | 15.9 | 4 | off | 1850 | 267 |
|   |   |   |   |   |   | on | −425 | 534 |
| 3 | cone/45° | 5.08 | −14 | 12.7 | 16 | off | 1250 | 391 |
|   |   |   |   |   |   | on | −700 | 859 |
| 4 | cone/45° | 5.08 | −14 | 12.7 | 24 | off | 1400 | 330 |
|   |   |   |   |   |   | on | 210 | 802.5 |
| 5 | cone/60° | 5.08 | −5 | 12.7 | 10 | off | 1250 | 403.8 |
|   |   |   |   |   |   | on | −950 | 883.8 |
| 6 | cone/60° | 5.08 | −14 | 12.7 | 21 | off | 1300 | 301 |
|   |   |   |   |   |   | on | 120 | 738 |
| 7 | cone/60° | 5.08 | 11 | 19 | 9 | off | 2100 | 141 |
|   |   |   |   |   |   | on | 160 | 736 |
| 8 | cone/60° | 5.08 | −2 | 19 | 14 | off | 1150 | 342 |
|   |   |   |   |   |   | on | −450 | 505 |

Figure 11:
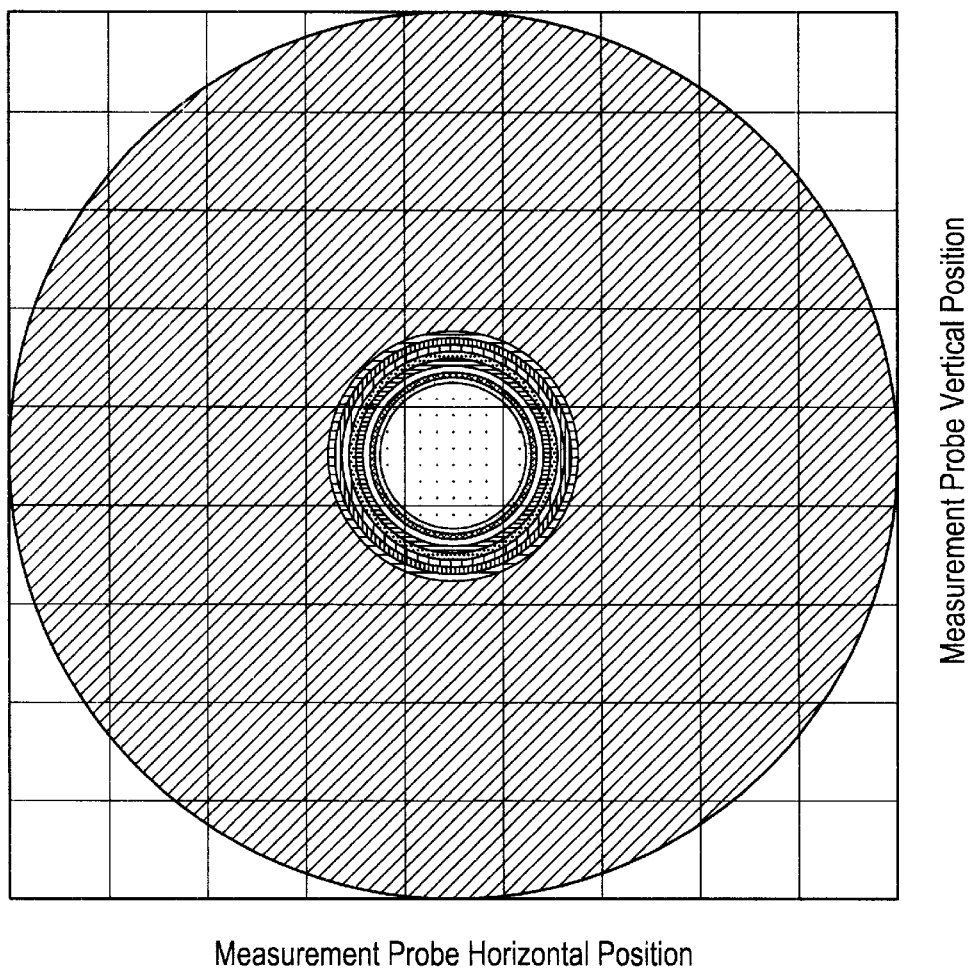
FIG. 11 is a graphical illustration representative of the uniform, "diverter-on" flow profile exhibited by the inventive exhaust system having an circular honeycomb substrate and a cone-shaped exhaust gas divergent device.

Referring now to FIG. 11, illustrated therein is graphical representation of the simulated "diverter-on" exhaust flow profile exhibited by the Example 6 exhaust system configuration (60° cone-shaped exhaust gas divergent device); the honeycomb substrate and low-flow resistance region images are seen superimposed on the flow profile. This flow profile is representative of the typical uniformly distributed flow achieved through the utilization of a cone-shaped exhaust gas divergent device; a negative flow in the first or central flow region and a uniformly distributed, positive flow volume in the peripheral cells.

Figure 12:
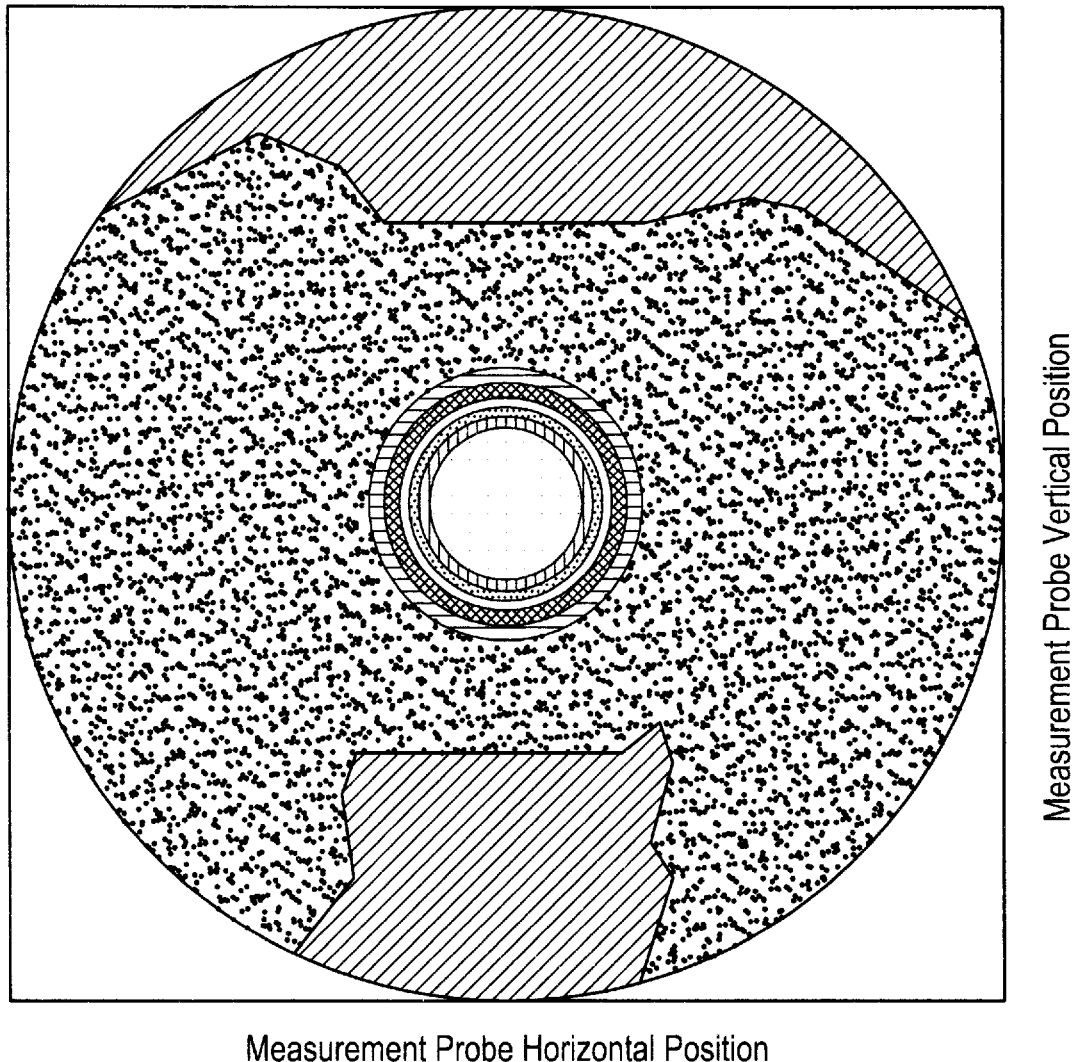
FIG. 12 is a graphical illustration representative of the uniform, "diverter-on" flow profile exhibited by another embodiment of the inventive exhaust system comprised of circular honeycomb substrate and a trumpet-shaped exhaust gas divergent device.

Referring now to FIG. 12 illustrated therein is graphical representation of simulated "diverter-on" exhaust gas flow profile exhibited by Example 2 exhaust system configuration (45° trumpet-shaped exhaust gas divergent device); the honeycomb substrate and low-flow resistance region images are again seen superimposed on the profile. This flow profile is representative of the typical, uniformly distributed flow achieved through the utilization of a trumpet-shaped exhaust gas divergent device; a negative flow in the first or central flow region and a high, uniformly distributed positive flow volume in the peripheral cells.

Comparison Example 9

A simulated exhaust system configuration resembling the system as depicted in FIG. 5, utilizing a simple round flat-plate diverter body, although not possessing an exhaust gas divergent device, was used for comparison with the flow characteristics generated by the exhaust gas divergent device-containing exhaust systems of above. Specifically, this comparison exhaust system configuration was comprised of the following: (1) an 11.83 cm. diameter, 400 cell per square inch (cpsi) cylindrical honeycomb structure possessing a 3.81 cm. diameter centrally-located round first or low flow resistance region and, (2) a fluidics apparatus comprised of a 19 mm diameter round diverter body positioned proximate to the honeycomb substrate's hole region approximately 9 mm upstream of the inlet face of the honeycomb substrate and approximately 1 mm. downstream from the diversion fluid conduit (air supply tube) outlet. Air, simulating exhaust flow, was again directed at the honeycomb substrate at a volumetric flow rate about 40 cubic feet per minute (cfpm) and diverter air of 10 cfpm was introduced through a diversion fluid conduit. Flow measurements were obtained as before, recorded in Table II and utilized to produce the flow profile of FIG. 3.

TABLE II

| Ex. No. | off/on | C. Flow V. (cfpm) | P. Flow V. (cfpm) |
|---|---|---|---|
| 9 | off | 1650 | 280 |
|   | on | 80 | 919 |

Referring now to FIG. 3, illustrated therein is a graphical representation of the simulated "diverter-on" exhaust flow profile exhibited by the comparison exhaust gas system configuration of Example 9; as above, the honeycomb substrate and low-flow resistance region images superimposed on the profile. This flow profile is representative of the non-uniform flow achieved without the use of an exhaust gas divergent device; a negative flow in the central or first flow region and a high, though non-uniformly distributed flow volume in the periphery (highest flow in the cells nearest the central region).

It will be appreciated from the foregoing description that the present invention has utility in a variety of systems for treating gas or other fluid streams, including any system wherein the handling of gas flows without the use of mechanical valves or other mechanical means of flow control is required. However, the systems of most immediate interest for such use are those involving the treatment of exhaust emissions from engines or other combustion exhaust gas sources. Accordingly, the preceding detailed description of the invention focused principally on such emissions control applications even though the use of the invention is not limited thereto.

Although the invention has been described with respect to the above illustrated description and examples, it may be subjected to various modifications and changes without departing from the scope of the invention. For example, although the examples have utilized only square cell channels, the invention can be extended to a variety of cell shapes for the honeycomb, (triangular, hexagonal, rectangular, flexible cells etc.). Furthermore, it is contemplated that although the above description describes the exhaust system as comprised of circular honeycombs it is appreciated that by suitably contouring the maximum diameter of the diverter body, the diversion fluid can be spread unevenly to direct exhaust gas through honeycombs of non circular cross-section, such as elliptical substrates.

We claim:

1. An engine exhaust system comprising:

a honeycomb structure having an inlet and outlet end disposed in a housing and located in an exhaust gas stream downstream from an engine, the honeycomb structure having a first substantially unobstructed flow region, and a second more obstructed flow region adjacent the first region, the first region being disposed to provide a substantially unobstructed flow path for the exhaust gases in the exhaust gas stream; and, a fluidics apparatus disposed in the exhaust stream comprising diverter body located proximate to an entrance of the first region, a diversion fluid source conduit for directing a diversion fluid toward the diverter body, and an exhaust gas divergent device disposed upstream of the of the honeycomb structure for directing the flow of the exhaust gas towards the second flow region.

2. The exhaust system of claim 1 wherein the exhaust gas divergent device includes a small diameter upstream portion, a large diameter downstream portion, and a side surface exhibiting a divergent angle connecting the two portions.

3. The exhaust system of claim 2 wherein the side surface exhibits a divergent angle between about 40–75 degrees.

4. The exhaust system claim 2 wherein side surface exhibits a divergent angle between about 60–75 degrees.

5. The exhaust system of the claim 2 wherein the downstream portion diameter is less than the diameter of the substantially unobstructed flow region.

6. The exhaust system of claim 1 wherein the honeycomb exhibits a circular shape and the divergent device exhibits a shape selected from the group consisting of cone-shaped, bell-shaped or trumpet-shaped.

7. The exhaust system of claim 1 wherein the conduit outlet is positioned sufficiently close to the diverter body whereby the diverter body imparts a flow component to the diversion fluid which is transverse to flow direction in the first region.

8. The exhaust system of claim 1 wherein the fluidics apparatus is positioned whereby a negative flow zone is created within the first region in a direction opposite that of the exhaust gas flow.

9. The exhaust system of claim 1, wherein the honeycomb structure is selected from the group consisting of (1) a variable cell honeycomb structure having a first group of cells and a second group of cells whose cell sizes are smaller than the first group of cells, and (2) a substantially cellular structure having an open core region running longitudinally parallel between the inlet and outlet ends of the structure and a peripheral region adjacent the open core, the peripheral region having a plurality of cells running longitudinally parallel between the inlet and the outlet ends of the structure.

10. The exhaust system of claim 1, wherein the honeycomb structure is centrally disposed in the housing, has a frontal area, wherein said first region comprises a central open core running longitudinally parallel between the inlet and outlet ends of the structure and the second region comprises a peripheral cellular structure characterized by a plurality of cells running longitudinally parallel between the inlet and the outlet ends of the structure.

11. The exhaust system of claim 10, wherein the central open core occupies an area in the range of 0.5 to 50% of the frontal area of the honeycomb structure.

12. The exhaust system of claim 1 wherein the honeycomb structure is a molecular sieve structure exhibiting a desorption temperature.

13. The exhaust system of claim 12 comprises wherein the molecular sieve structure comprises zeolites supported on the honeycomb structure, the zeolites selected from the group consisting of ZSM-5, USY, Mordenite, Beta zeolites and combinations of these.

14. The exhaust system of claim 13 wherein the molecular sieve structure comprises extruded zeolites selected from the group consisting of ZSM-5, USY, Mordenite, Beta zeolites and combinations of these.

* * * * *